(12) United States Patent
Sonnek

(10) Patent No.: US 6,880,486 B2
(45) Date of Patent: *Apr. 19, 2005

(54) PLASTIC WOOD DUCK HOUSE WITH WETLANDS POLE

(76) Inventor: Norbert P. Sonnek, 56721- 190th St., Wells, MN (US) 56097

( * ) Notice: Subject to any disclaimer, the term of this patent is extended or adjusted under 35 U.S.C. 154(b) by 140 days.

This patent is subject to a terminal disclaimer.

(21) Appl. No.: 09/875,553

(22) Filed: Jun. 7, 2001

(65) Prior Publication Data

US 2002/0195061 A1 Dec. 26, 2002

(51) Int. Cl.$^7$ ............................................. A01K 31/00
(52) U.S. Cl. ....................................... 119/428; 119/435
(58) Field of Search ................................ 119/428, 463, 119/435, 462, 470, 473, 482, 485, 486, 467, 432

(56) References Cited

U.S. PATENT DOCUMENTS

| | | | | |
|---|---|---|---|---|
| 1,258,703 A | * | 3/1918 | Perkins ........................ | 119/428 |
| 3,177,849 A | * | 4/1965 | Isenberg ...................... | 119/435 |
| 3,643,631 A | * | 2/1972 | Wade et al. ................. | 119/434 |
| 4,765,277 A | * | 8/1988 | Bailey et al. ............... | 119/57.9 |
| 4,768,466 A | * | 9/1988 | Burns et al. ................. | 119/428 |
| 4,889,075 A | * | 12/1989 | Byrns .......................... | 119/435 |
| 4,928,631 A | * | 5/1990 | Smith .......................... | 119/428 |
| 5,134,970 A | * | 8/1992 | Oh ............................... | 119/428 |
| 5,355,835 A | * | 10/1994 | Freed .......................... | 119/57.9 |
| 5,740,762 A | * | 4/1998 | Bennett ....................... | 119/428 |
| 5,878,537 A | * | 3/1999 | Flischel ....................... | 52/101 |
| 6,016,768 A | * | 1/2000 | Colucci ....................... | 119/57.9 |
| 6,244,220 B1 | * | 6/2001 | Dawson ....................... | 119/428 |
| 6,311,643 B1 | * | 11/2001 | Christian et al. ........... | 119/431 |
| 6,354,244 B1 | * | 3/2002 | Green .......................... | 119/428 |
| 6,405,679 B1 | * | 6/2002 | Sonnek ........................ | 119/432 |

* cited by examiner

Primary Examiner—Michael J. Carone
Assistant Examiner—Susan C. Alimenti

(57) ABSTRACT

An improved nesting box for migratory waterfowl, especially for wood ducks, made of durable white plastic in a sleek, smooth and round canister shape. This wood duck house with round contours and a tight fitting lid deters predators from entry as there are no edges or ridges for predators to grasp. The ingress and egress hole is of sufficient size to allow a wood duck in flight to easily alight into the inside nesting area. The ingress hole is of sufficient length from the bottom of the canister to be longer then the reach of any predator. The invention provides a mesh grid climbing ladder secured to the inside bottom and side of the canister for easy egress by the ducklings upon hatching. This wood duck house is not to be mounted on a tree. An additional improvement over the prior art is that this invention is mounted on a round plastic hollow pole and planted directly in the water of a wetlands area thereby allowing the ducklings to exit the canister and jump safely to the water below. The wide diameter of the pole makes it extremely difficult for predators to grasp and climb. The pole is sealed at both ends thus preventing water seepage and cracking from expanding ice when planted in a cold climate pond. The pole can also be planted in a shoreline area inside a second segment cylinder, of slightly larger diameter, and featuring inside stabilizing collars.

3 Claims, 5 Drawing Sheets

PLASTIC WOOD DUCK HOUSE WITH WETLANDS POLE

CROSS REFERENCE TO RELATED APPLICATIONS

| U.S. PATENTS | | | |
|---|---|---|---|
| 4,889,075 | December 1984 | Byrns | 119/329 |
| 5,746,156 | February 1996 | Petrides | 119/329 |
| 4,768,466 | October 1986 | Burns | |
| 3,177,849 | March 1962 | Isenberg | |
| 5,941,194 | April 1998 | Potente | |
| 5,878,537 | August 1997 | Flischel | |
| 5,355,835 | December 1993 | Freed | |

OTHER PUBLICATIONS

Ryan, "Breeding Biology of Wood Ducks using natural cavities in Southern Illinois", 1998, pages 112 through 123, The Wildlife Society Manlove, "Patterns of nest attendance in female Wood Ducks", 2000, pages 286 through 291, The Cooper Ornithological Society Bradley and Zicus, contributors to "First Flight" with description of Tom Tubbs nesting box through the Minnesota Wildfowl Association

BACKGROUND—FIELD OF INVENTION

This invention relates to a plastic, cylindrically shaped duck nesting house, especially for Wood Ducks and other migratory waterfowl. The Wood Duck house consists of a deep cavity canister for the nest, a climbing grid for the ducklings to egress the nest upon hatching and a tight fitting lid. The Wood Duck house is mounted atop a plastic sealed pole that can be planted in a wetland area plus two separate pole segments, which fit inside one another for planting in a shoreline area.

BACKGROUND—DESCRIPTION OF PRIOR ART

The Wood Duck is a migratory waterfowl that spends the winter in warm southern waters and flies north in the spring. The Wood Duck species was thought by many to be on its way to extinction in the early part of the twentieth century. Conservationists made every effort to provide natural habitat for the Wood Duck to encourage the population to grow. The Wood Duck has traditionally laid its eggs in a cavity nest in a hollowed out tree trunk, usually sycamores, cottonwood, oak and American beech. However, predators, most notably, raccoons, mink, weasels and opossum were able to decimate a nest quite easily by simply climbing the tree trunk. Squirrels are known to molest a nest and take up residence there. Even though conservationists tried to ensure natural habitat for the Wood Duck to nest, many old-growth tree trunks were destroyed, which further diminished the population of Wood Ducks.

Studies (Manlove and Hepp, 1999) have shown that nests that are close to water have adequate survival rates. Bradley and Zicus recommend that a Wood Duck nest should be no more than 30 to 100 feet from water. Nesting sites that are closer to water, or actually on the water, had higher counts of eggs and greater numbers of hatched ducklings. The ducklings exit the nest and jump to the ground within one day of hatching from the eggs. The hen calls to the new hatchlings and they follow her sound to the wetland area. The passage from the nest in a hollowed out tree trunk, to the ground, and then on foot to the water, can be the most treacherous for the new duckling. Another study (Rya, Kawula and Gates, 1998) observed that 33%, or more, of the brood can be lost to predators between the time the ducklings leave the nest and join the mother in a wetland area. The orientation of the entrance of the nesting cavity to the closest wetland did not appear to make a difference to the success of the nest.

The breeding season for Wood Ducks is from January to July depending on the area of the United States to which they migrate. The incubation period is about 31 to 35 days with most eggs hatching by the $32^{nd}$ day. The female Wood Duck must sit on the eggs for most of this entire period to maintain a constant temperature for the developing eggs. The nesting female has exercise requirements that will take her away from the nest for more than an hour each day. This includes foraging time to maintain her own healthy body condition. The Wood Duck feeds on plant life, seeds, roots and weeds in shallow water. The female's time away from the nest increases the exposure of the nest to predators. An average nest size is 9 or 10 eggs. If a second female lays her eggs in an existing nest, the total eggs laid in that nest can be more than 14.

The Tom Tubbs nesting box is for attachment to a tree trunk. U.S. Pat. No. 4,889,075 by Byrns describes a plastic duck house that can be attached to a tree trunk or a pole. U.S. Pat. No. 5,746,156 by Petrides is for a convertible bird box made of wood. U.S. Pat. No. 4,768,467 by Buns describes a nest box of resilient material that appears to also suggest the need for an attachment to a tree trunk.

There are several disadvantages to all current duck nesting boxes.

(1) One of the main disadvantages of all current cavity type nesting boxes is that they are to be attached to a tree trunk, which increases the risk from predators. Raccoons and other predators can easily ascend a tree trunk and use the trunk as leverage to reach inside and decimate the nest of its eggs. U.S. Pat. No. 5,941,194 by Potente describes a cavity nest entrance shield to make it more difficult for a predator to reach into a nest to extract the eggs. However, this shield would make it very difficult for a Wood Duck to fly directly into the entrance with the shield covering the opening.

(2) A second disadvantage of most current nesting boxes is that they are made of wood. Observations have shown that nesting boxes made of wood may increase the temperature inside the nesting compartment and destroy the eggs before hatching.

(3) The rough features and outer corners of wood nesting boxes also allow grasping places for predators to use as leverage to reach inside and seize the eggs in the nest.

(4) The contours of a box also take the full force of the wind and can be toppled in strong winds.

(5) Another disadvantage is that wood nesting boxes and their metal parts will rot and rust with the weather conditions and will need to be repaired or replaced to ensure a productive nest each season.

This duck nesting house was built for the purpose of increasing the population of wild migratory wood ducks. There have been two main problems to be solved in this endeavor. The first and most important problem is keeping predators, primarily raccoons, away from the nest during the incubation of the eggs. Second, having a duck nesting house that is inexpensive and easy to maintain so that wildlife advocates, environmentalists and waterfowl enthusiasts could sustain and increase the wood duck population in wilderness areas. The present invention is also meant for use in an urban or suburban environment Wood ducks will migrate to a neighborhood backyard if there is a pond, river or creek within 1½ miles from the nest. Wood ducks have been observed hatching in a hollowed out tree trunk in a city park and then walking the distance of a mile to the nearest pond. Wood ducks are wild migratory waterfowl that some folks will have occasion to see. There was a time when there were sufficient old hollowed out tree trunks for wood ducks to find their own nest. However, as wetlands and old growth forests have been diminished by development of houses and factories, so has the natural environment for the wood duck. With the natural environment of the wood duck being developed for human habitation, the wood duck population has been decimated. Numerous individuals and waterfowl associations have sought solutions to increase the population of wood ducks before the species is completely eliminated.

The present invention was built to solve those problems. Raccoons are notorious predators to the wood duck. Raccoons eat the eggs and eat the baby ducks, or fledglings, before they grow feathers and can fly away. (a) The wood duck nesting house of the present invention was very deliberately designed with a smooth, slippery surface of PVC plastic material to thwart the raccoon. If the duck nesting house were made of wood, the raccoon can very easily use its claws to dig into the wood and claw its way to the nest. Raccoons and squirrels have scaled tree trunks with the same agility. However, the smooth, slippery exterior surface of the present invention makes it impossible for the raccoon to make indentations in the plastic material. The raccoon cannot use its claws to scratch or gouge indentations in the plastic material to use for climbing to the nest. By using slippery smooth PVC plastic material, the present invention was designed to stop the natural predator from clawing its way to the nest. (b) The round canister shape of the present invention was a deliberate design to thwart the raccoon by denying it any leverage to grasp. There are no corners or edges in the present invention. There are no borders or fulcrums that the raccoon can use to anchor its hind feet while its front paws reach for eggs in a nest. There are no screws or hinges or protuberances of any type on the exterior of the canister. The round contour of the present invention once again denies the raccoon any advantage. The raccoon just slips off the slippery round exterior surface and falls to the ground because it can find nothing to grasp. (c) The prototype of the present invention was built with a distance of 9½ inches from the bottom of the duck house canister to the ingress hole. That is a calculated design feature to insure that a raccoon cannot reach from the top of the pole, around the bottom and side of the canister and grab hold of the edge of the ingress hole. The 9½ inch distance is too far for a raccoon to reach. Any raccoon that would try to reach the ingress hole would need to let go of the pole, try to hug the slippery surface of the canister, a canister that is 10 inches in diameter, and scamper up a smooth, round surface. That is an impossible task for the raccoon. A raccoon cannot hug a round object with a diameter that large. Those rapacious raccoons that have tried to scale numerous prototypes have just slid off and fallen to the ground. There are currently about a dozen prototypes being tested in various wilderness locations in Minnesota. The prototypes have been in location for two or three annual nesting cycles. To date, not one prototype duck nesting house has been successfully raided by a raccoon, a squirrel or any other predator. Not one. In fact, the egg count after the nesting season has shown that nests routinely produce ten to twelve eggs, which is considered a great success. Of even greater interest is the fact that some locations showed eggshells on the ground, next to the pole, beneath the canister. This suggests that the mother duck assisted the fledglings by peeling back and discarding bits of the eggshell to help the fledgling hatch from the eggshell. Any raccoon or predator would have ingested the entire egg. Observations of the prototype after the nesting period have found the mother ducks in a nearby pond, each leading 10 or 12 little fledglings. The prototype of the present invention has been a huge success over prior art in repelling the attacks from any predators and has dramatically increased the chances to save the wood duck from extinction.

Of equal importance is cost and maintenance of the wood duck nesting house. If that task is made too difficult, then wood duck enthusiasts will soon abandon the endeavor at upkeep of the houses. If it were too difficult or expensive to maintain the nesting houses, the nesting houses would soon deteriorate and be unusable by the wood ducks. Nesting houses made of wood have been previously shown to seriously deteriorate over several years due to the wet and cold weather. Wood will rot and replacing wood nesting houses is costly and time consuming. Nesting houses made of metal have also deteriorated quickly with the wet weather. The expense and time involved in walking through a wilderness area to replace wood or metal duck nesting houses is a serious deterrent to using that type of structure. The present invention solves this problem. The present invention made of plastic material will not rot like wood, nor rust like metal. The PVC material has a much longer life and is therefore less expensive to maintain, as it will not need to be repaired or replaced as quickly as wood or metal.

In addition to the deterioration caused by weather, neither wood nor metal nesting houses have been shown to provide the most suitable inside nest temperature range for healthy egg development. By setting atop the eggs, the mother duck controls the proper temperature for egg incubation. However, if the climate outside the nesting house heats up, the dark wood or dark metal nesting house will absorb the heat from the outside and thereby raise the temperature inside the nesting area to an unacceptable level that will cook the eggs before the eggs are ready to hatch. The wood or metal nesting house has been shown to be vulnerable to outside temperature changes. The white plastic material of the present invention will not absorb the outside heat, like that of wood or metal, and will therefore more effectively assist the mother duck to maintain the proper temperature inside the nesting area. The testing of the prototypes for inside nesting area temperature range, has shown the PVC plastic material of the present invention to be of superior quality control over the wood or metal nesting houses. The temperature range inside the prototypes for the present invention did not significantly nor adversely increase as the outside temperature increased. The ability of the white plastic material used in the present invention was beneficial over the prior art in not absorbing the increased outside temperature. The white plastic material of the present invention actually facilitated maintaining the proper inside nesting temperature for the incubation of the eggs. This is a significant improvement over the prior art.

The pole of the present invention was also designed to deter predators. The diameter of the prototype of the present invention is 3 inches, much larger than the usual one to two inches of most poles of prior art. This extra wide diameter makes it very difficult for a raccoon or squirrel or other predator to hug the pole and climb. The front and hind limbs of predators cannot easily stretch around a pole of this diameter and climb it at the same time. The pole was designed to make it a strenuous task, if not an impossible task, for predators to stretch their limbs around and climb the pole. The slippery, smooth round surface of the pole also inhibits the ability of any predator to climb the pole. Unlike a wood pole, a raccoon cannot use his claws to gouge indentations in the plastic to assist in climbing the pole. Videotaped observations of a pair of raccoons attempting to climb the pole showed one raccoon actually standing on the shoulders of the second raccoon to gain height on the pole. These two very resourceful raccoons still could not climb the pole of the present invention. The pole was too slippery and too wide in diameter for the predators to use. The pole was designed to do exactly that, thwart the predators. The wide diameter of the pole is an improvement over the prior art.

The present invention provides a pole that is to be planted in a pond or on land. Wood ducks need to nest on or near water, as that is where they will find their food source and shelter. The pole of the present invention is a hollow chamber that is sealed at each end so that water cannot enter into the inside of the chamber. This insures that water cannot leak into the inside of the chamber. Water inside the chamber could freeze in cold climates. As any water freezes, it expands and could crack the pole and render it useless. The pole of the present invention was sealed at each end so that it could effectively be planted in water without threat of damage from water seeping into the chamber and freezing. Prototypes of the present invention have been planted in ponds and wetlands that have been frozen over for the winter. Holes were dug through the ice of several frozen ponds. The poles were inserted through the ice hole and planted in the soft mud beneath the ice. The poles could also have been planted when the pond was not frozen over. Planting the pole in water, with the duck nesting house atop, has several advantages. First, most predators, including raccoons and squirrels, will not attempt to enter the water to get to the nesting house. This greatly increases the chance for success of the nest. Secondly, the fledglings have a soft landing on the water when they jump from the nesting house one day after hatching from the egg. Again, this greatly facilitates the success of the nest. The pole is made of PVC plastic, which will not rot like wood when planted in water, nor rust like a metal pole. The pole of the present invention was designed so that it would not crack or deteriorate under harsh winter weather conditions. The pole, used in a wetland area, is a great improvement over the prior art.

The pole of the present invention can also be planted for use in a shoreline area. It is suggested that the pole and nesting house be planted, at least, 15 feet away from any trees to deter squirrels from jumping from a tree branch to the top of the nesting house. To secure the pole in a shoreline area, a second segment was designed. The second or bottom segment of the prototype pole is only 24 inches in length. The second segment is slightly wider in diameter than the main pole. The second segment is sealed at its bottom end to prevent water or soil from seeping into the inside. The 24 inch long second pole segment is planted in the ground with the top of this segment being at ground level. The main pole is fitted with several stabilizing collars at its lower end so that it will fit tightly and securely inside the bottom segment and will not wobble. At the end of the nesting season, the main pole with nesting house atop can be removed for cleaning and storage. The 24 inch long bottom pole segment remains planted in the ground and can be capped on top, at ground level, to prevent soil from entering the chamber. Before the next nesting season, the cap can be easily identified and removed and the main pole replanted in the 24 inch long bottom segment. The pole used for the wetland area and the pole used for the shoreline area are of the same dimensions and detail. Stabilizing collars have been added to the bottom of the main pole for shoreline use.

In a natural setting the wood duck will make a nest in a hollowed out tree trunk. The designs of the prior art have been made to attach to a tree as in Byrns (U.S. Pat. No. 4,889,075). But attaching a man made wood duck house to a tree trunk provides a means for the predators to easily gain access to the wood duck nest by scaling the tree. The present invention completely rejects any attempt to produce a wood duck nesting house that is to be attached to a tree. In fact, the present invention suggests that the wood duck house should be at least 15 feet away from any tree and even more preferably, the wood duck house should be planted in a pond. This aspect of the present invention, to completely break from tradition, has lead to the great success of this wood duck nesting house. The success of this nesting house can be measured in the large number of eggs hatched and wood duck fledglings raised in the wild to maturity.

The present invention further breaks from tradition by being made with a round, smooth and slippery surface void of anything that a predator can use to advantage. All prior art has been made with hinges or corners or edges that raccoons can and have used to gain entrance to the nesting cavity. The present invention was made to deliberately break with the past designs that were found to be ineffective in preventing predators from gaining access to the nesting cavity. The new design of the present invention has successfully and repeatedly thwarted all predators in all field tests to date. This design works as no others before it have worked.

Raccoons are the largest in size predator of the wood duck. Raccoons are larger than squirrels. The present invention considered the size of the wood ducks greatest predator and designed a distance between the bottom of the nest canister to the ingress hole and made that distance longer than a raccoon can grasp. The present invention was made to be predator proof and it has succeeded in that endeavor where the prior art has not.

It is difficult for this inventor to compare the present invention for a wild migratory waterfowl to a backyard birdhouse as described in Wade (U.S. Pat. No. 3,643,631) or Bennett (U.S. Pat. No. 5,740,762). The present invention seems mutually exclusive from Wade or Bennett. The focus of the Wade and Bennett birdhouses is to attract and provide a nesting place for birds of various sizes. The Wade and Bennett birdhouses are generally to be located in someone's backyard so that humans can enjoy watching the birds. Using any of a number of pole attachments as in Colucci (U.S. Pat. No. 6,016,768) can thwart the occasional squirrel coming into a backyard. The present invention is not meant to be located in someone's backyard. Under most circumstances, except in field testing, the nesting house of the present invention will not be regularly watched and enjoyed by humans, unless the nest is located within 1½ miles of a pond, creek or river. The present invention is made to be planted in the wild, in a wilderness setting where there are real and regular predators. Because of the strong danger from predators the present invention was designed to thwart the predator in all aspects of its behavior.

(a) This means the present invention was deliberately made of slippery smooth material so that predators could not use their claws to climb on a rough exterior surface.

(b) The present invention was made with no edges or borders or corners for predators to use for leverage.

(c) The length and width of the present invention was designed so that predators could not easily wrap themselves around the pole or the nesting house.

None of these special features of the present invention were an issue in the Wade or Bennett birdhouses because they didn't need to be. The focus of the Wade and Bennett birdhouses was not to deter predators but to provide a pleasant birdhouse for someone's backyard. The present invention focuses on the need to deter and thwart predators so that the wood duck population can be saved and indeed increased in the wild. This inventor understands that the Wade patent includes a mesh climbing grid or ladder. However, it should be noted that the mesh grid in Wade appears to be made of metal as is the total of the Wade birdhouse. As has been previously stated, metal will rust under normal weathering conditions. The mesh grid in the present invention is made of PVC plastic, which will withstand wet and cold conditions and not rust or deteriorate. The present invention has solved the problems of the prior art so successfully that it has won the endorsement of the Minnesota Waterfowl Association and won praise and recognition from the Ducks Unlimited organization. These two influential groups immediately recognized the problem solving improvements of the present invention over the prior art.

SUMMARY

In accordance with the present invention, a Wood Duck house made with polymerized vinyl compound (PVC) parts is all white and consists of a round, cylindrical canister 10, a tight fitting removable lid 11 with handle 12 and an inside duckling climbing ladder 14. The material used to make the invention reflects the heat from the sun. The material does not absorb heat and therefore does not interfere with the female duck's ability to regulate the temperature of the eggs in the nest. The canister 10 is of sufficient depth to simulate a cavity nest site in a hollowed out old-growth tree trunk. Nesting materials, such as wood shavings or saw dust, can be placed in the bottom of the canister 10 and removed at the end of each nesting season when the duck house is easily cleaned. There are several small drainage holes in the bottom of the canister 10, under the nesting area, to allow for drainage of rain that may come in through the entrance hole 13. This feature also allows for additional ventilation of the nesting cavity. This duck house has an entrance and egress hole 13 that is of sufficient height from the bottom of the canister 10 to effectively deter predators from being able to reach inside the container 10 to extract eggs or hatchlings. The surface of this duck house is smooth and round, which makes it extremely difficult for any predator to find a place to grasp for leverage. The entrance hole 13 is of sufficient height and width to allow a duck in flight to easily alight to the inside of this cavity nest. The tight fitting lid 11 ensures that predators cannot remove the lid 11. The handle 12 atop the lid 11 makes it easy to open the canister 10 for cleaning at the end of the season.

The invention has an inside climbing ladder 14 made of a nylon mesh grid which is secured to the bottom of the canister 10, under the nest, with a nylon nut and bolt 16. The mesh grid ladder 14 curves up the inside wall of the canister 10 and rises to the egress hole 13. The mesh grid ladder 14 is slightly wider in width than the width of the egress hole 13. The width of the mesh grid ladder 14 allows sufficient space for the hatching to make his escape from the nest. Just under the egress hole 13, the mesh grid ladder 14 is secured to the inside wall of the canister 10 by means of a nylon band 15 across the width of the mesh grid ladder 14. The nylon band 15 is fastened to and through the mesh grid 14 to the wall with a plurality of nylon nuts and bolts 16. This band 15 secures and stabilizes the mesh grid ladder 14 and also forms a staging prop to assist the duckling in exiting the duck house. The open spaces of the mesh grid ladder 14 are of such size as to easily allow the webbed feet of a new hatchling to climb the height of the canister 10 to the egress hole 13 without difficulty.

The Wood Duck house can be mounted atop a sealed wetland pole 22 which resists cracking in frozen ponds as no water can seep into the inner chamber of the pole. The wetland pole 22 can be planted in a frozen pond by breaking a hole in the ice and planting the pole 22 through that opening into the soft mud below. The wetland pole 22 is topped with a water closet fitting 20 and attached to the underside of the canister 10 with a plurality of threaded nylon fasteners 21. This unique sealed wetland pole 22 allows the hatchlings to jump from the nesting cavity directly to a soft landing on the water below. This greatly diminishes the risk from predators on the land and enhances the chance for success of the entire brood.

The Wood Duck house can also be mounted atop a segmented pole for a shoreline area. The top of the top pole segment 30 is attached to the underside of the duck house canister 10 in the same manner as the wetland pole 22. The bottom of the top pole segment 30 is fitted with several stabilizing collars 31 that prevent movement when the top pole segment 30 is fitted inside the bottom pole segment 32 of slightly larger diameter. The bottom pole segment 32 is sealed at its bottom end with an end cap 23 and is easily planted in the ground away from the water's edge. The pole and duck house should be planted at least fifteen feet away from any tree to deter squirrels from jumping from a tree branch to the top of the duck house. At the end of the nesting season, the duck house canister 10 and top pole segment 30 can be removed with the bottom pole segment 32 capped with an end cap 23 and remaining in place in the ground until the next nesting season.

OBJECTS AND ADVANTAGES

The objects and advantages of the present invention are:

(1) A duck house that can be erected away from a tree trunk will be a great deterrent to a Wood Duck's natural predators. This invention planted in a wetland area provides additional safety for the new ducklings. A new duckling can jump from the nesting compartment directly to the water below. This allows the hen to exercise immediate assistance to her brood. The new hatchlings have immediate access to their natural food supply in the water.

(2) A white plastic duck house will reflect the heat from the sun. This will allow the Wood Duck herself to regulate the temperature of the eggs in the nest. A plastic duck house will not absorb heat from the sun and will not raise the temperature in the nesting compartment to levels that will destroy the eggs.

(3) The round features of this duck house and the smooth material make it exceedingly difficult for a predator to grasp any angle to use as leverage. The exterior is not rough and there are no corners that could provide grasping places or leverage for a predator to gain entrance to the eggs in the nest.

(4) The round contours of the present invention will allow wind to glide around it easily. There are no flat surfaces that tend to blunt the wind. The round design of the present invention will keep it stable in strong winds.

(5) The material used in the present invention will not rot or rust. There are no wood or metal parts that require repair or replacement.

DRAWING FIGURES

Figure 1:
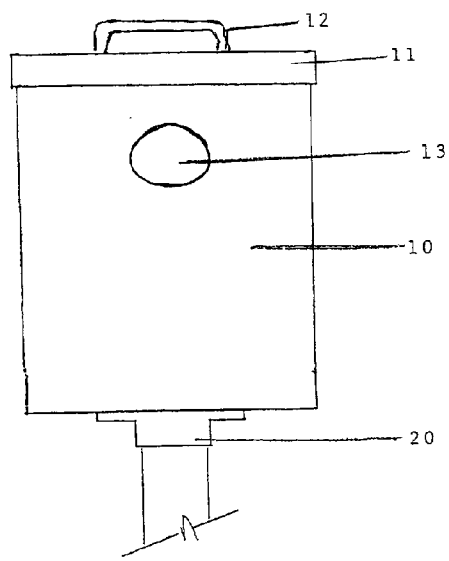
FIG. 1 is a frontal view of the duck house with removable lid on top.
Figure 1:
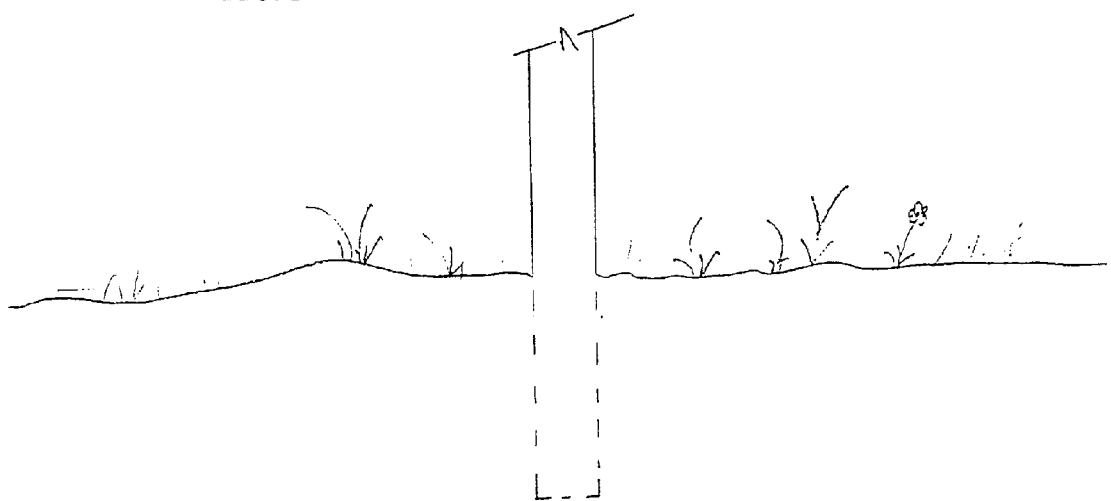
Figure 2:
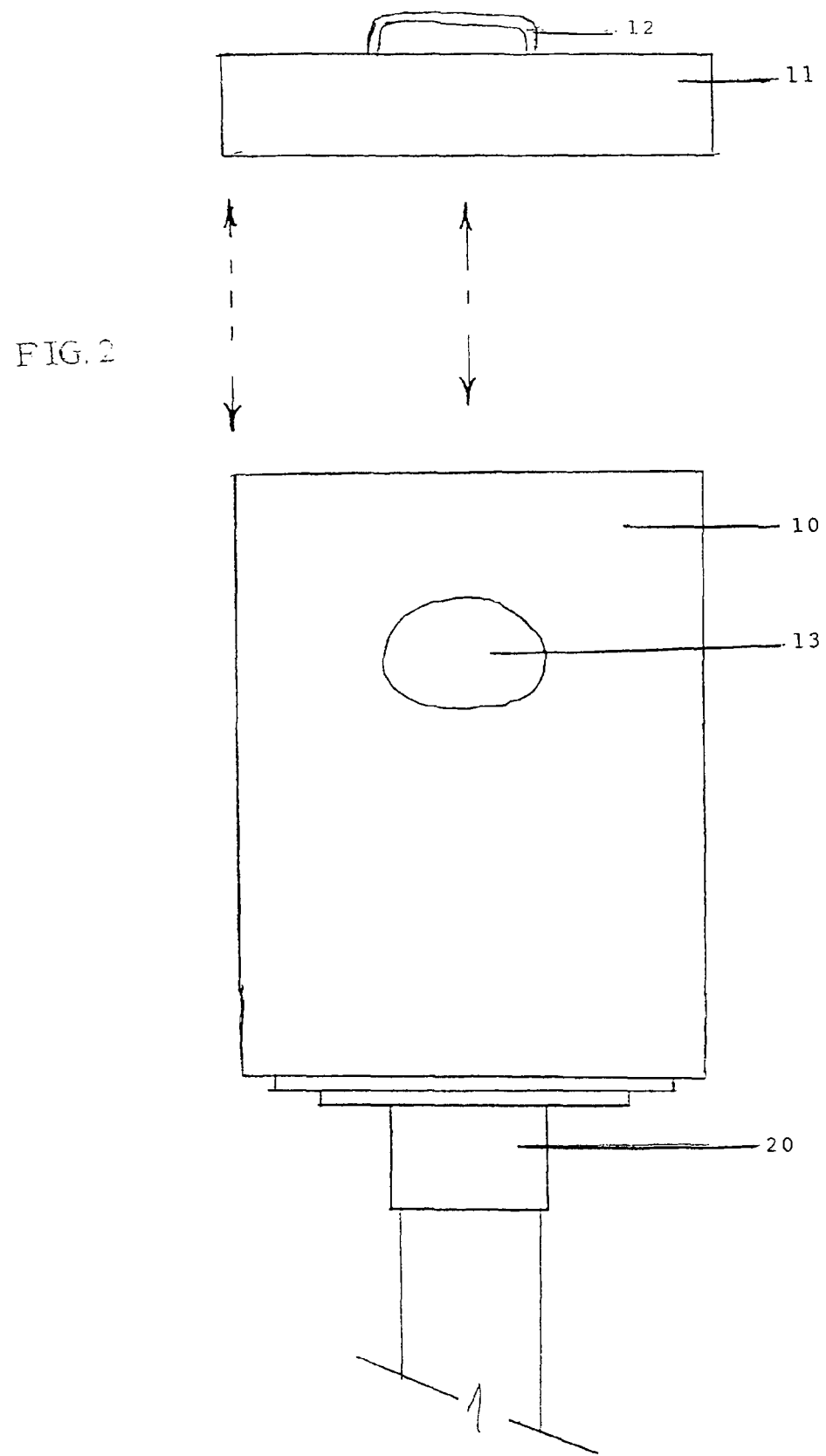
FIG. 2 is a frontal view of said duck house, FIG. 1, with the said lid removed.
Figure 3:
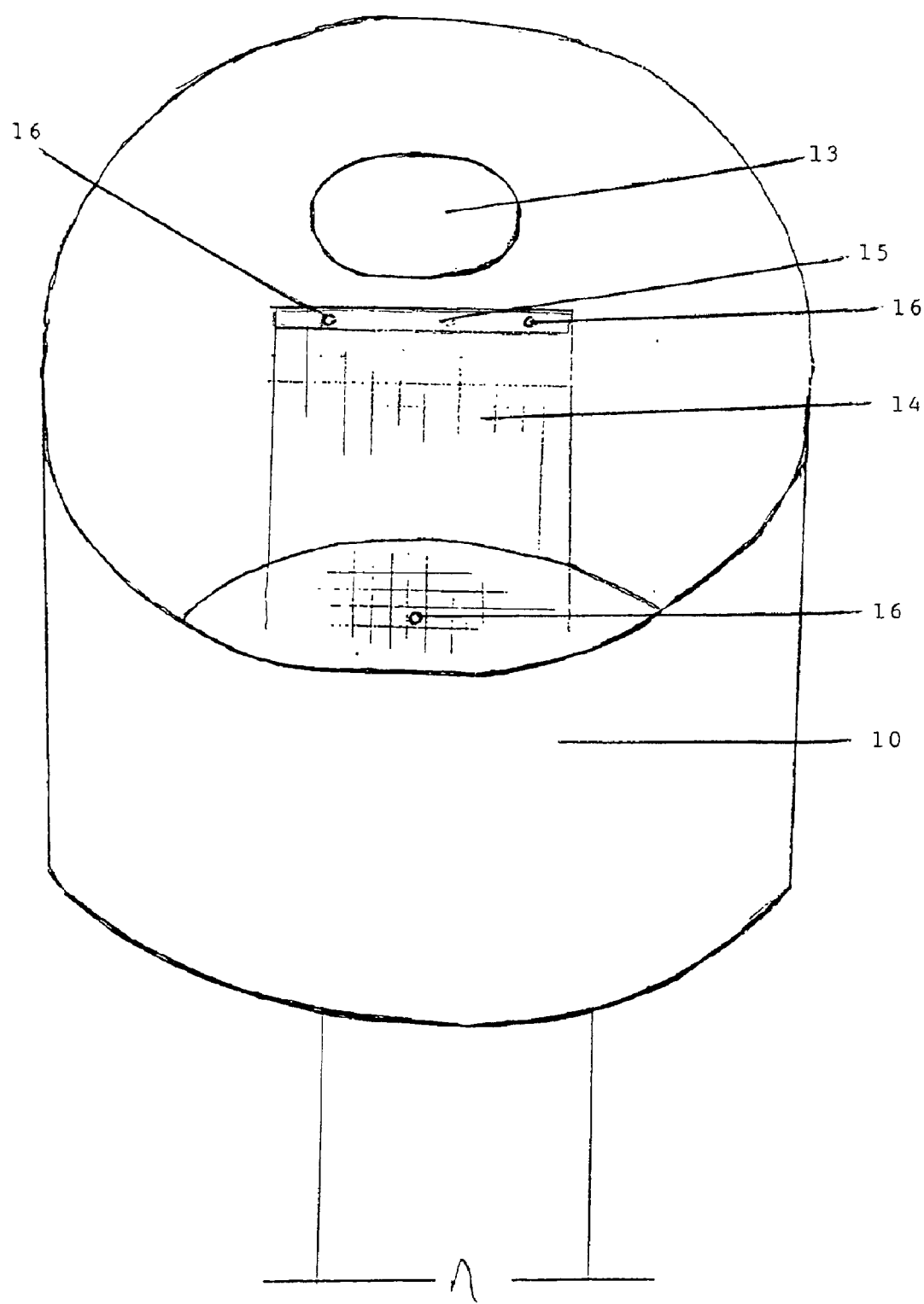
FIG. 3 is a perspective view of the inside of said duck house, FIG. 2, with a view of the duckling climbing ladder and band fastener.
Figure 4:
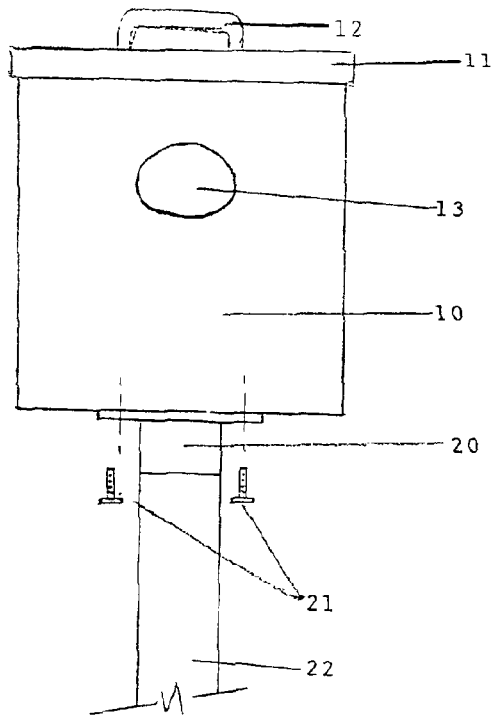
FIG. 4 is a view of said duck house, FIG. 1, with a view of the wetlands pole and end cap sealing the bottom end of the pole.
Figure 4:
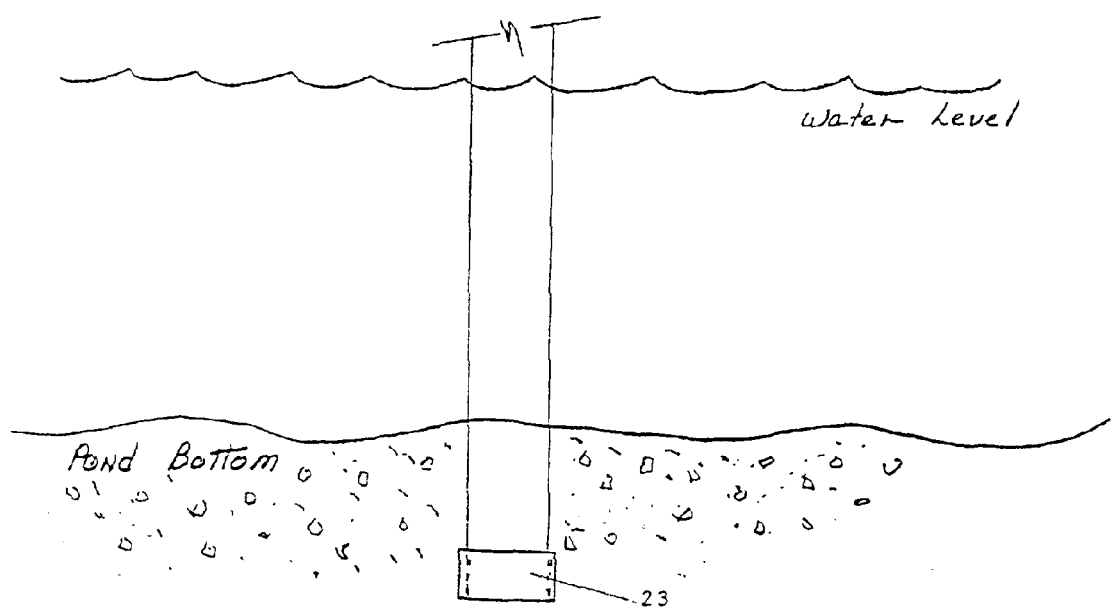
Figure 5:
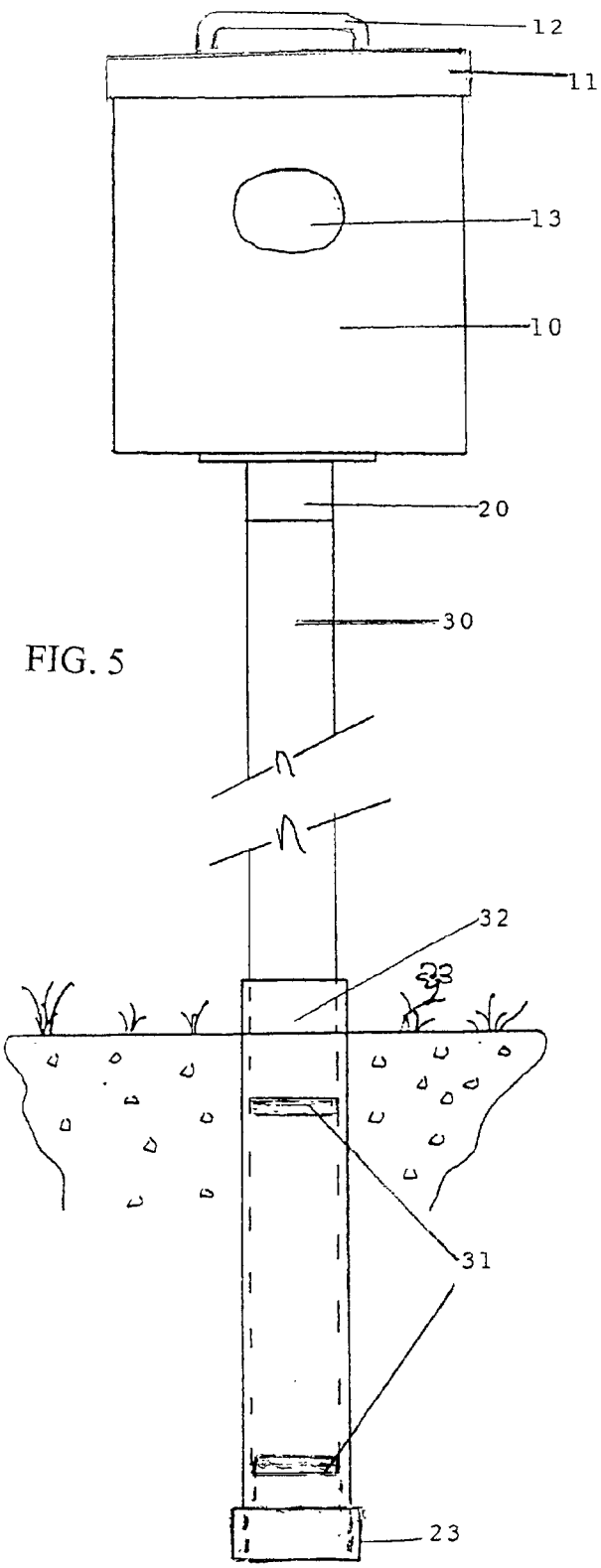
FIG. 5 is a view of said duck house, FIG. 1, with a view of the segmented shoreline pole and stabilizing rings.
Figure 5A:
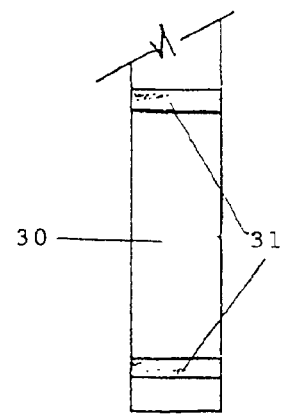
FIG. 5a is a view of said stabilizing rings secured to the bottom of top pole segment.
Figure 5B:
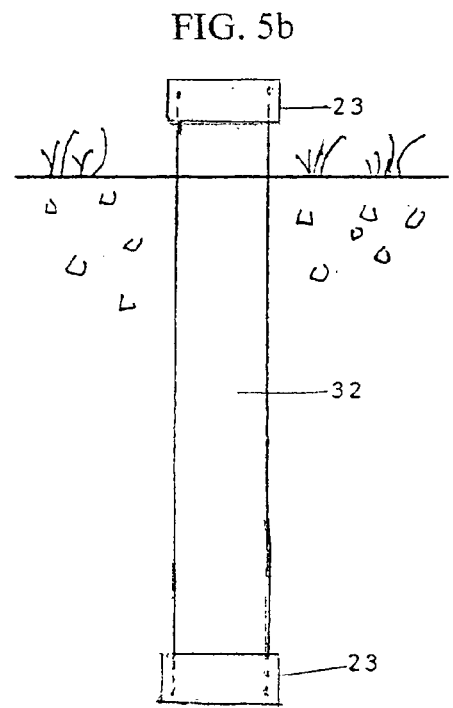
FIG. 5b is a view of bottom pole segment with end caps on top and bottom ends.

What is claimed is:

1. A cylindrical duck nesting house for ducklings comprising:

(a) a canister and removable lid with handle, said canister and removable lid made of white, plastic material;

(b) an entrance and egress hole in said canister;

(c) a mesh grid climbing ladder secured to the bottom of said canister and secured to the vertical inside of said canister whereby said ducklings can exit the nest upon hatching.

2. A cylindrical duck nesting house as claimed in claim 1 further comprising: a round, hollow pole made of white, plastic material; a water closet fitting attached to the top of said pole to secure said pole to bottom of said caster; an end cap fitted to the bottom of said pole whereby said pole can be planted in a wetlands area without water seepage to inside of pole chamber.

3. A cylindrical duck nesting house as claimed in claim 1 further comprising: a round, segmented pole made of white plastic material; said pole including a top pole segment and a bottom pole segment; a water closet fitting attached to the top of the top pole segment to secure to the bottom of said canister, the said top pole segment sliding inside the bottom pole segment of slightly larger diameter, stabilizing collars encircling the bottom end of said top pole segment; an end cap fitted to the bottom of said bottom pole segment; an end cap on the top of the said bottom pole segment whereby the said bottom pole segment can be permanently planted in shoreline areas and temporarily capped with said end cap at the end of the nesting season.

* * * * *